United States Patent
Oshiro

(10) Patent No.: US 11,761,388 B2
(45) Date of Patent: Sep. 19, 2023

(54) THROTTLE OPERATING DEVICE

(71) Applicant: ASAHI DENSO CO., LTD., Hamamatsu (JP)

(72) Inventor: Yukio Oshiro, Hamamatsu (JP)

(73) Assignee: ASAHI DENSO CO., LTD., Shizuoka (JP)

(*) Notice: Subject to any disclaimer, the term of this patent is extended or adjusted under 35 U.S.C. 154(b) by 0 days.

(21) Appl. No.: 17/539,748

(22) Filed: Dec. 1, 2021

(65) Prior Publication Data

US 2022/0178312 A1 Jun. 9, 2022

(30) Foreign Application Priority Data

Dec. 4, 2020 (JP) ................................. 2020-201993

(51) Int. Cl.
*F02D 11/02* (2006.01)
*B62K 23/06* (2006.01)
*B62K 11/14* (2006.01)

(52) U.S. Cl.
CPC .............. *F02D 11/02* (2013.01); *B62K 11/14* (2013.01); *B62K 23/06* (2013.01)

(58) Field of Classification Search
None
See application file for complete search history.

(56) References Cited

U.S. PATENT DOCUMENTS

| | | | | |
|---|---|---|---|---|
| 6,275,027 B1 * | 8/2001 | Kogure | ..................... | G01B 7/30 324/207.2 |
| 8,082,819 B2 * | 12/2011 | Case | ...................... | B62K 23/06 74/489 |
| 9,533,571 B1 * | 1/2017 | Urmosi | ................... | B60K 26/02 |
| 10,843,764 B2 * | 11/2020 | Hengst | .................... | B62K 11/14 |

FOREIGN PATENT DOCUMENTS

| JP | 2010-053836 A | | 3/2010 |
|---|---|---|---|
| JP | 2010053836 A | * | 3/2010 |

* cited by examiner

*Primary Examiner* — Vicky A Johnson
(74) *Attorney, Agent, or Firm* — Pearne & Gordon LLP

(57) ABSTRACT

A throttle operating device includes: a fixing member which is fixed to a vicinity of a grip formed at a tip of a handlebar of a vehicle; a throttle lever which is attached by extending from the fixing member and configured to be pivoted while the grip is gripped; and a detection sensor configured to detect a rotational operation angle of the throttle lever. A drive source of a vehicle is controlled based on the rotational operation angle of the throttle lever detected by the detection sensor, and a cover member is provided to cover an opening of the fixing member, and the cover member is formed with an accommodation portion capable of accommodating the detection sensor at a predetermined position.

7 Claims, 11 Drawing Sheets

THROTTLE OPERATING DEVICE

CROSS-REFERENCE TO RELATED APPLICATIONS

The present application claims the benefit of priority of Japanese Patent Application No. 2020-201993, filed on Dec. 4, 2020, the content of which is incorporated herein by reference.

TECHNICAL FIELD

The present invention relates to a throttle operating device capable of controlling a drive source of a vehicle based on a rotational operation angle of a throttle lever detected by a detection sensor.

BACKGROUND ART

As a throttle operating device of the related art for operating a throttle opening in a vehicle such as an ATV and a four-wheel buggy, for example, as disclosed in JP-A-2010-53836, a device provided with a throttle lever (thumb throttle lever) attached to a vicinity of a grip can be mentioned. Such a throttle operating device of the related art is configured so that when a finger of the driver's hand holding the grip is extended to the throttle lever and a rotational operation is performed, a detection sensor can detect a rotational operation angle and control an engine of the vehicle.

However, in the above-described related art, a separate member (accommodation box) for fixing an angle sensor (detection sensor) and a substrate on which the angle sensor is formed to an appropriate position while waterproofing the angle sensor and the substrate is required. As a result, there is a risk that the number of parts will increase. Therefore, the applicant focuses on a lid member (cover member) which is fixed to a handlebar and covers an opening of a fixing member and considers reducing the number of parts by using the lid member (cover member).

SUMMARY

The invention is made in view of such circumstances and an object of the invention is to provide a throttle operating device which can easily waterproof a detection sensor, fix the detection sensor at an appropriate position where a rotational operation angle of a throttle lever can be accurately detected, and reduce the number of parts.

According to an aspect of the invention, there is provided a throttle operating device including: a fixing member which is fixed to a vicinity of a grip formed at a tip of a handlebar of a vehicle; a throttle lever which is attached by extending from the fixing member and configured to be pivoted while the grip is gripped; and a detection sensor configured to detect a rotational operation angle of the throttle lever, where: a drive source of a vehicle is controlled based on the rotational operation angle of the throttle lever detected by the detection sensor; and a cover member is provided to cover an opening of the fixing member, and the cover member is formed with an accommodation portion capable of accommodating the detection sensor at a predetermined position.

DESCRIPTION OF EMBODIMENTS

Hereinafter, an embodiment of the invention will be specifically described with reference to the drawings.

Figure 1:
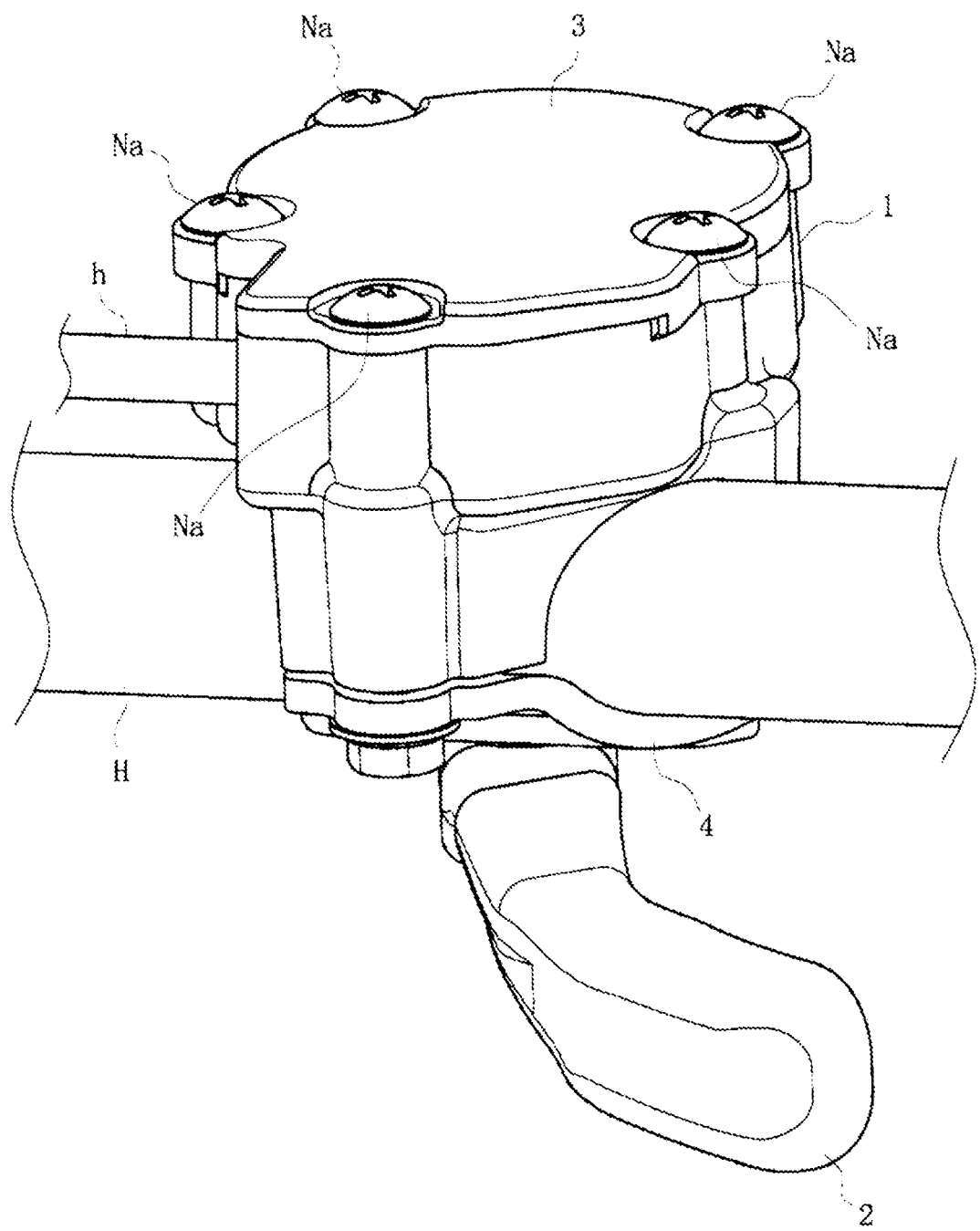
FIG. 1 is an overall perspective view illustrating a throttle operating device according to an embodiment of the invention.
Figure 2:
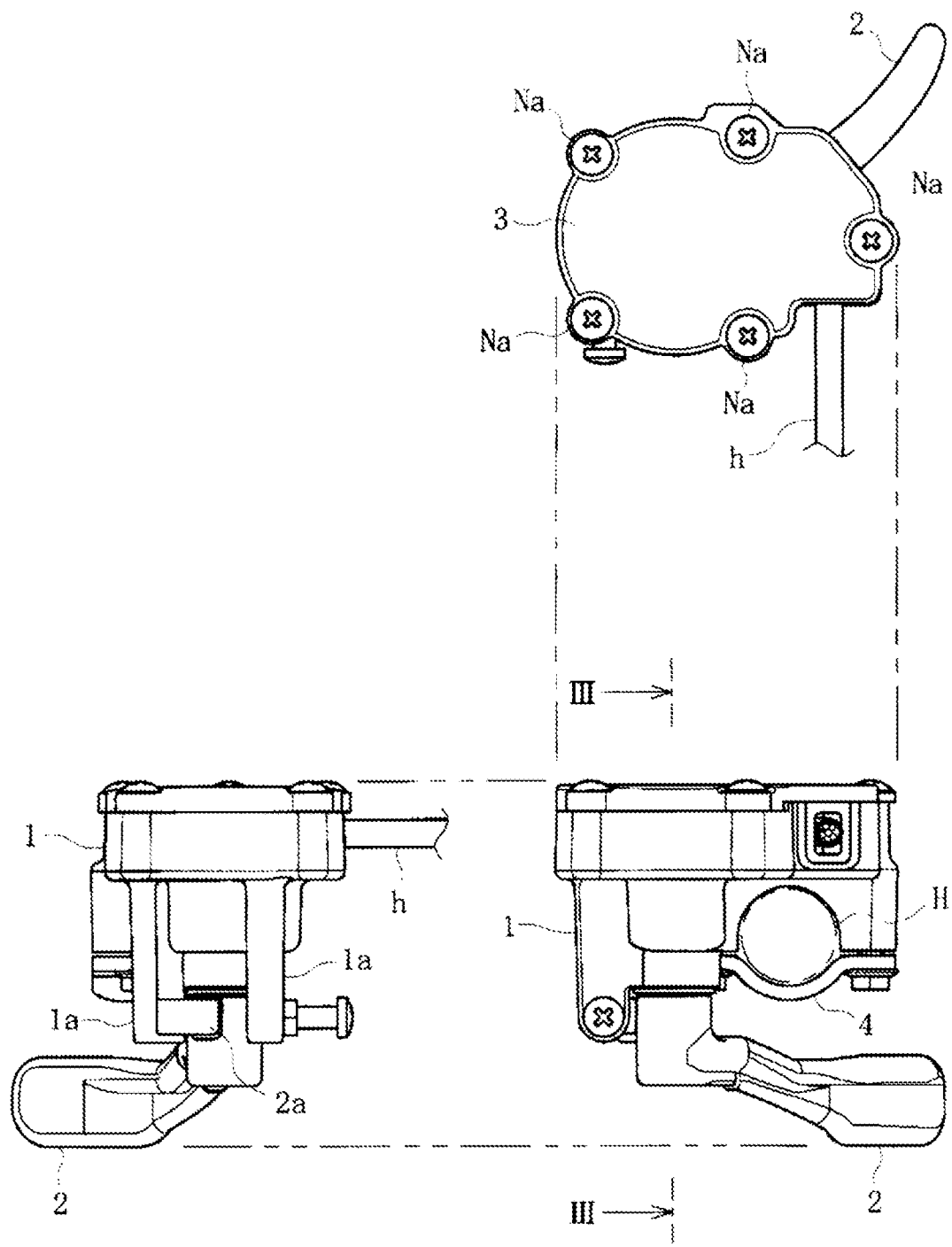
FIG. 2 is a three-view orthographic projection illustrating the throttle operating device.
Figure 3:
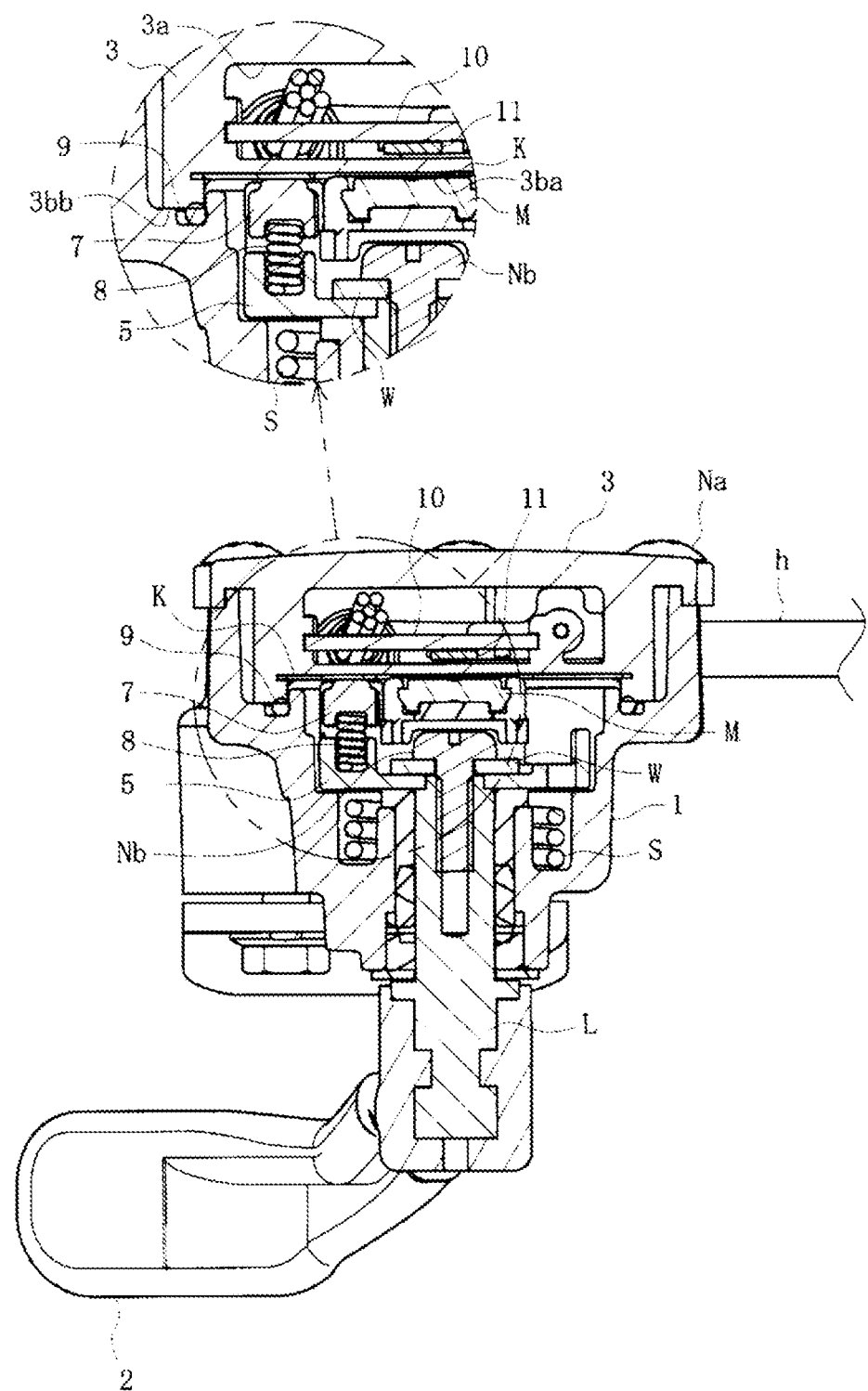
FIG. 3 is a cross-sectional view taken along the line of FIG. 2.

A throttle operating device according to the present embodiment is fixed to a handlebar provided in a vehicle such as an ATV or a buggy so that an engine (drive source) of the vehicle can be controlled. As illustrated in FIGS. 1 to 3, the throttle operating device is configured to include a fixing member 1, a throttle lever 2 which is a so-called thumb lever, a cover member 3, a rotating member 5, a resistance force applying unit 7, a detection sensor 11, a return spring S, and a sliding member K.

Figure 4:
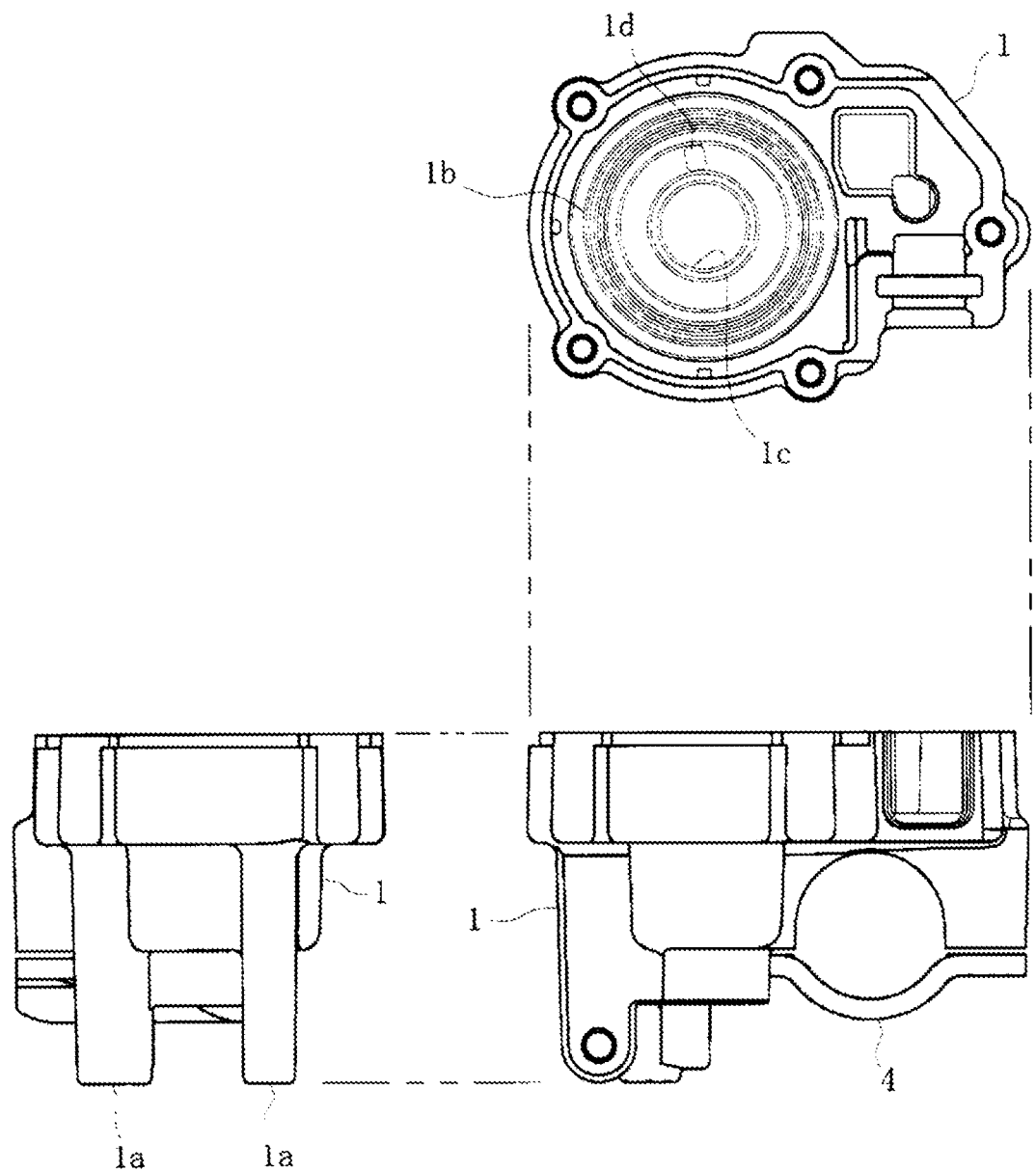
FIG. 4 is a three-view orthographic projection illustrating a fixing member of the throttle operating device.

The fixing member 1 is fixed to a handlebar H to pivotally support the throttle lever 2 and is fixed to a vicinity of a grip formed at a tip of the handlebar H of the vehicle. As illustrated in FIG. 4, the fixing member 1 has an opening at an upper side to form an accommodation recess portion inside and a pinching member 4 is attached to the fixing member 1. The fixing member 1 can be fixed by pinching the handlebar H with the pinching member 4.

Further, the fixing member 1 is formed with a pair of regulating portions 1a-1a formed at a predetermined position on the outside thereof so as to be separated from each other by a predetermined dimension. Further, on a bottom surface of the accommodation recess portion formed inside, a mounting groove 1b for fitting and positioning a sealing member 9 (see FIG. 3), a through hole 1c through which a shaft member L is inserted to allow a rotational operation of the throttle lever 2, and a locking portion 1d for locking the other end Sb (see FIGS. 6 and 8) of the return spring S are formed.

Figure 7:
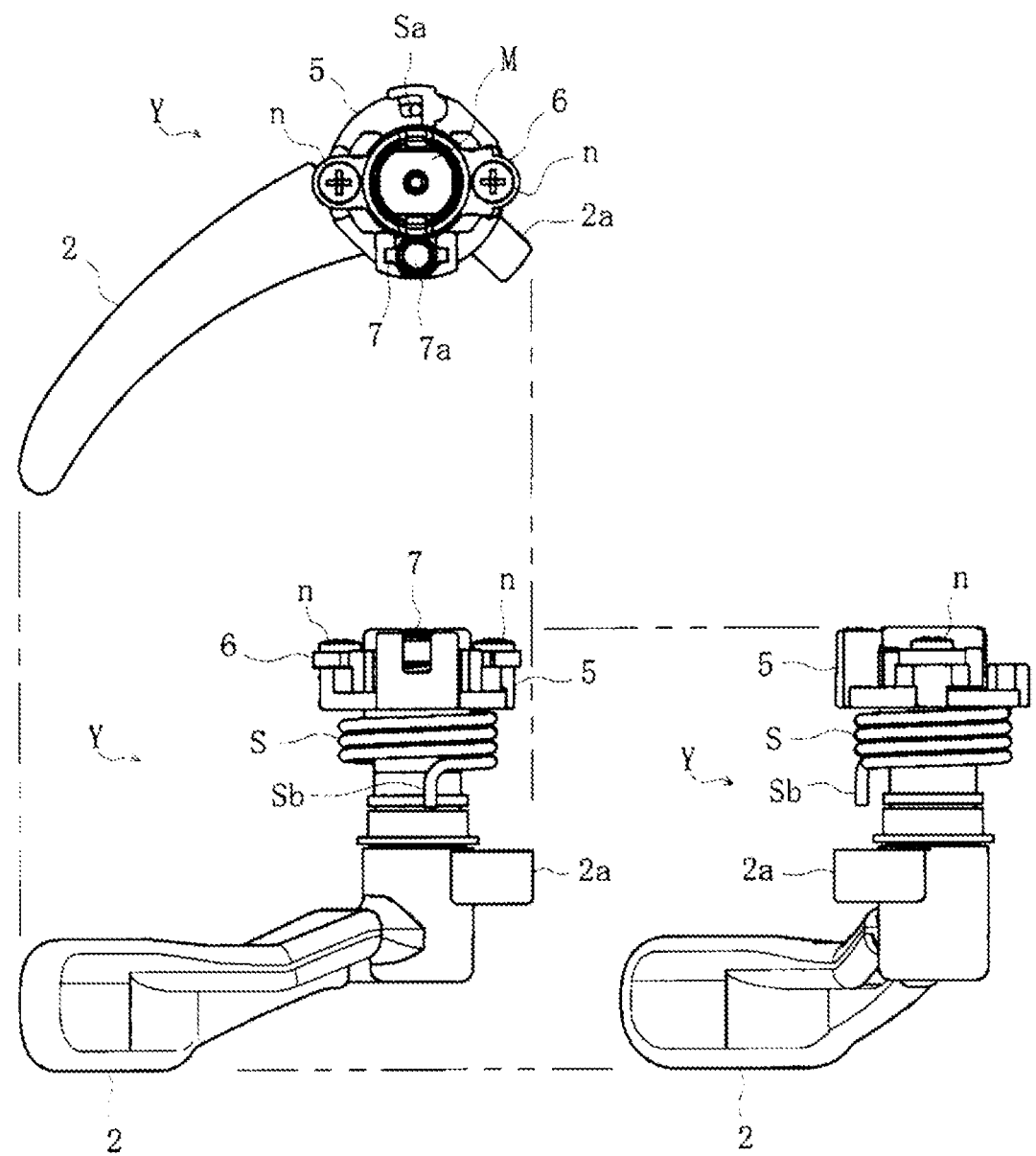
FIG. 7 is a three-view orthographic projection illustrating the throttle lever of the throttle operating device and the integrated component which rotates together with the throttle lever.

The throttle lever 2 is attached so as to extend from a lower side of the fixing member 1 so that a driver can pivot the throttle lever 2 while gripping the grip of the vehicle. As illustrated in FIG. 3, the throttle lever 2 is connected to the shaft member L. The shaft member L rotates around a shaft in response to the rotational operation of the throttle lever 2 and the rotating member 5 is fixed to a tip of the shaft member L by a mounting screw Nb and a washer W. As illustrated in FIG. 7, the throttle lever 2 has a protruding portion 2a protruding laterally. The throttle lever 2 is configured such that the protruding portion 2a is located between the pair of regulating portions 1a-1a in a state of being assembled to the fixing member 1. As a result, rotation angles of the throttle lever 2 and the shaft member L are regulated within a predetermined range.

Figure 6:
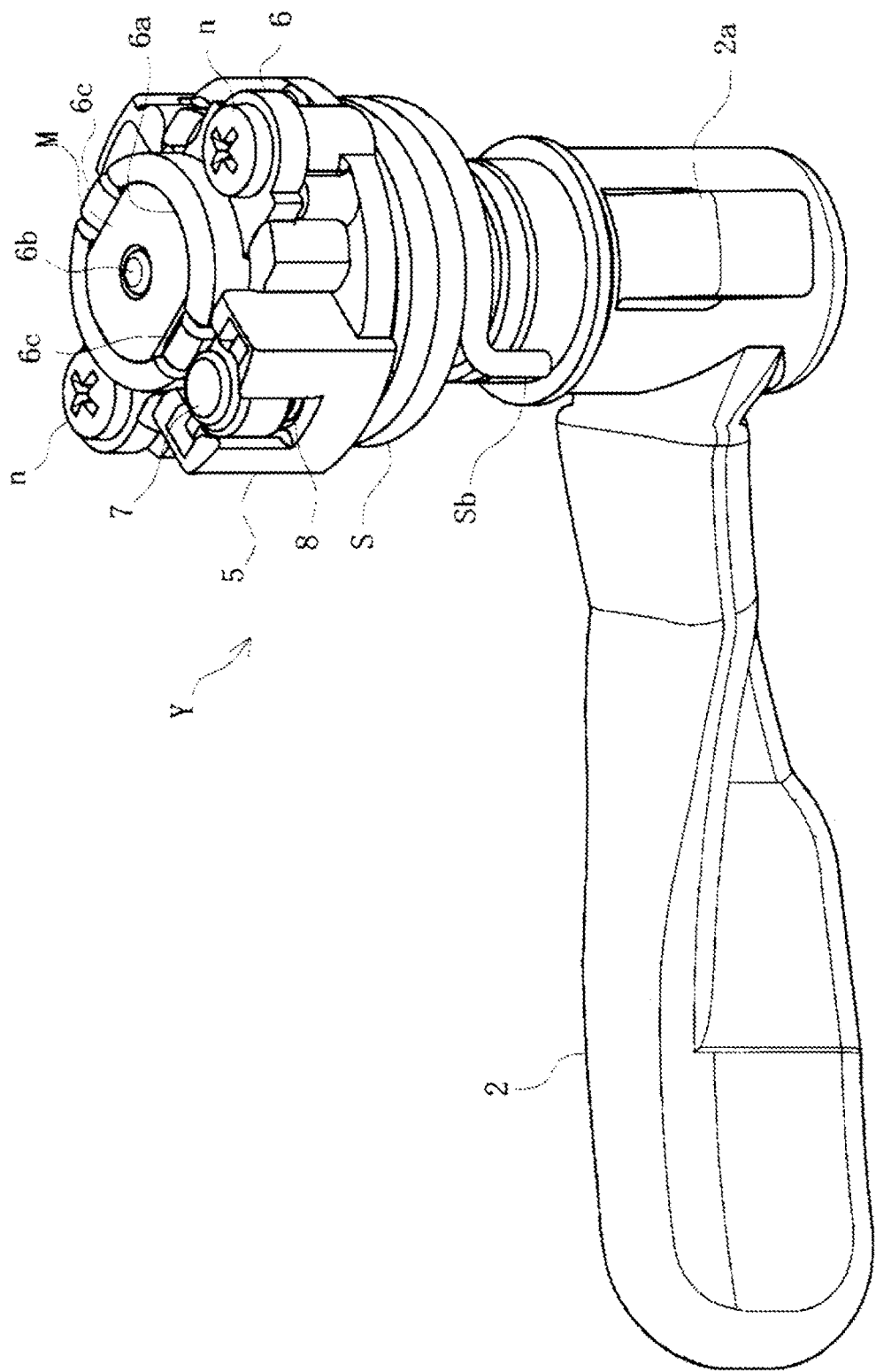
FIG. 6 is a perspective view illustrating a throttle lever of the throttle operating device and an integrated component which rotates together with the throttle lever.

As illustrated in FIGS. 6 and 7, the rotating member 5 is made rotatable in response to the rotational operation of the throttle lever 2. As illustrated in FIG. 9, a mounting portion 5a to which the resistance force applying unit 7 and a coil spring 8 (see FIG. 8) can be attached, a through hole 5b through which a tip of the shaft member L can be inserted, a locking portions 5c for locking one end Sa (see FIG. 8) of the return spring S are formed in the rotating member 5. However, the rotating member 5 is assembled so that one end Sa of the return spring S is locked to the locking portion 5c of the rotating member 5 and the other end Sb is locked to the locking portion 1d of the fixing member 1. Therefore, when the shaft member L and the rotating member 5 are rotated by rotating the throttle lever 2, the rotating member 5 is urged toward an initial position by the return spring S.

Figure 8:
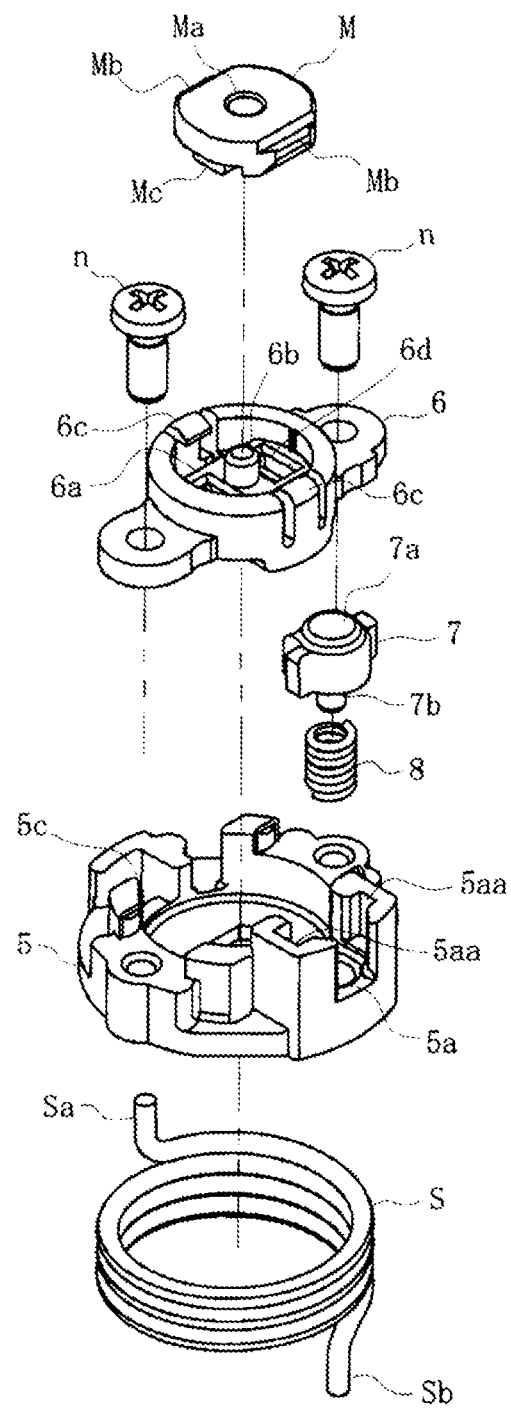
FIG. 8 is an exploded perspective view illustrating an assembled state of the integrated component of the throttle operating device.
Figure 9:
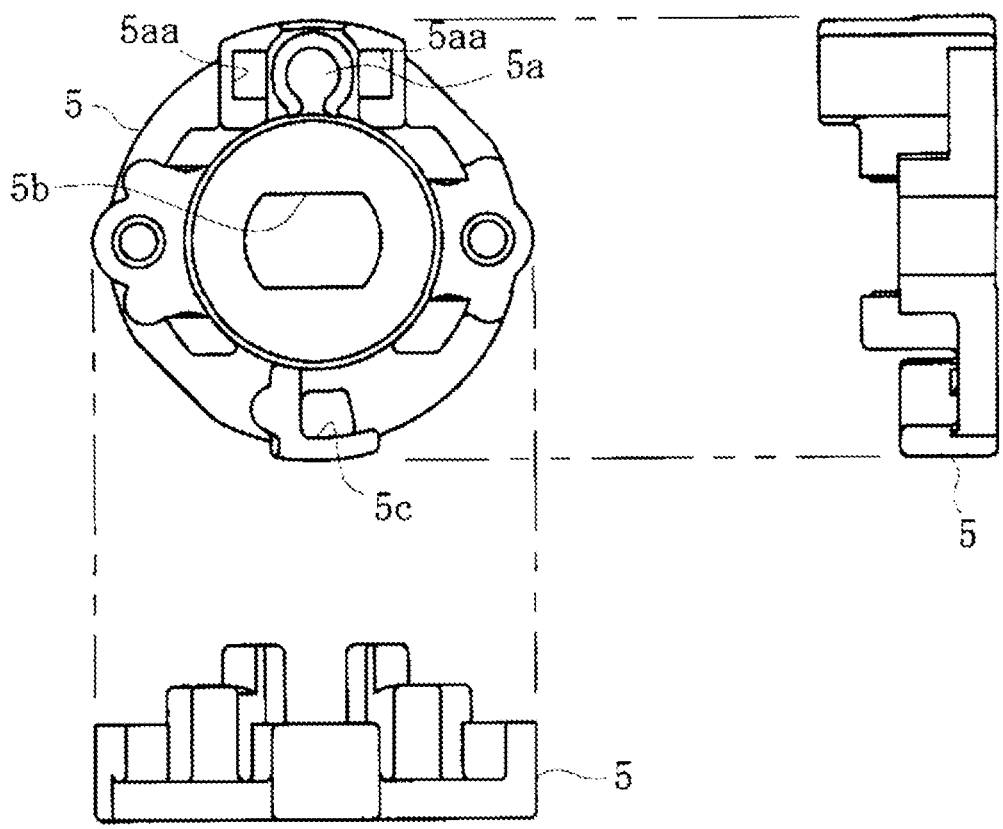
FIG. 9 is a three-view orthographic projection illustrating a rotating member of the throttle operating device.
Figure 10:
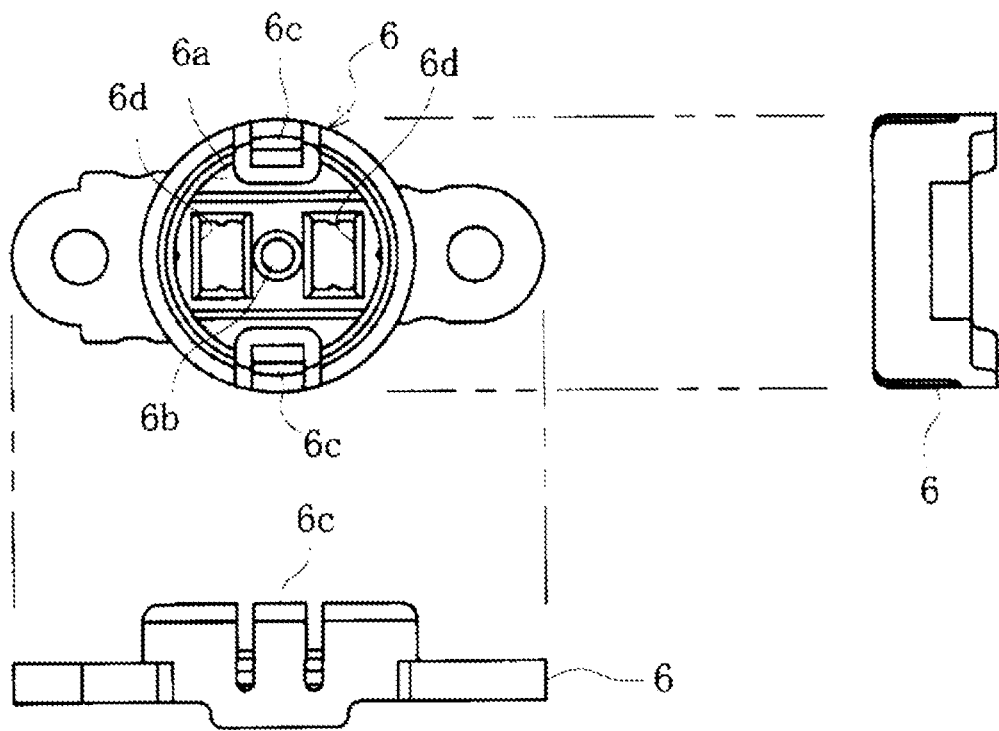
FIG. 10 is a three-view orthographic projection illustrating a mounting member of the throttle operating device.

Further, as illustrated in FIGS. 6 to 8, a mounting member 6 is attached to the rotating member 5 by a pair of mounting screws n. The mounting member 6 holds a magnet M. As illustrated in FIG. 10, the mounting member 6 is configured to include an accommodation recess portion 6a into which a magnet M can be fitted, a central convex portion 6b formed so as to protrude at a center position of a bottom surface of the accommodation recess portion 6a, a pair of locking claws 6c formed so as to face each other at an opening edge of the accommodation recess portion 6a, and a fitting hole 6d formed on the bottom surface of the accommodation recess portion 6a.

Figure 11:
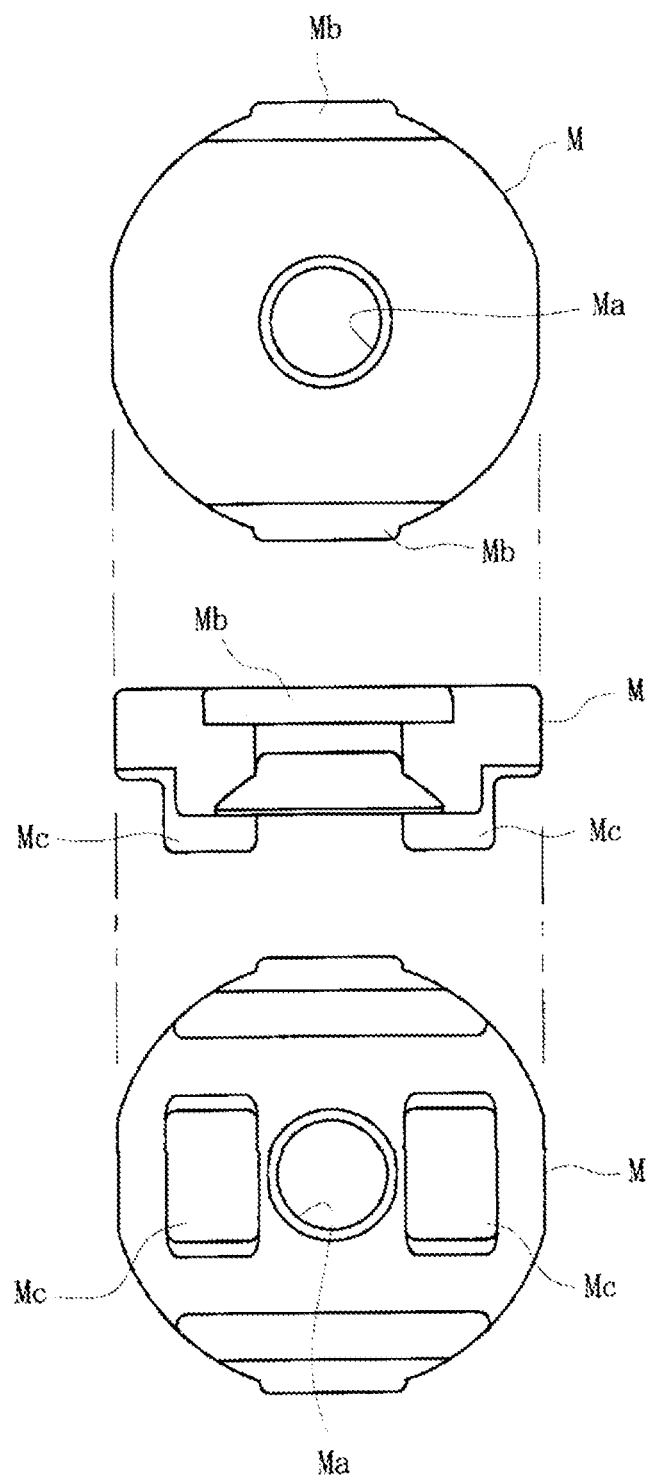
FIG. 11 is a three-view orthographic projection illustrating a magnet of the throttle operating device.

The magnet M is fitted and attached to the accommodation recess portion 6a of the mounting member 6 and can rotate together with the shaft member L in response to the rotational operation of the throttle lever 2. As illustrated in FIG. 11, the magnet M is configured to include a through hole Ma through which the central convex portion 6b can be inserted, a notch portion Mb formed at an upper surface edge, and a pair of protruding portions Mc formed protruding from a lower surface. Then, by fitting the protruding portion Mc into the fitting hole 6d while inserting the central convex portion 6b through the through hole Ma, the magnet M is accommodated in the accommodation recess portion 6a. In addition, the magnet M is prevented from coming off by pressing the locking claw 6c against the notch portion Mb.

As described above, the throttle lever 2, the shaft member L, the rotating member 5, the mounting member 6, the magnet M, and the return spring S are assembled to form an integrated component Y, as illustrated in FIG. 6. Therefore, the integrated component Y is rotated with respect to the fixing member 1 by rotating the throttle lever 2 and the integrated component Y is urged toward the initial position by the return spring S. Therefore, by loosening an operating force on the throttle lever 2, the throttle lever 2 returns to the initial position.

Figure 5:
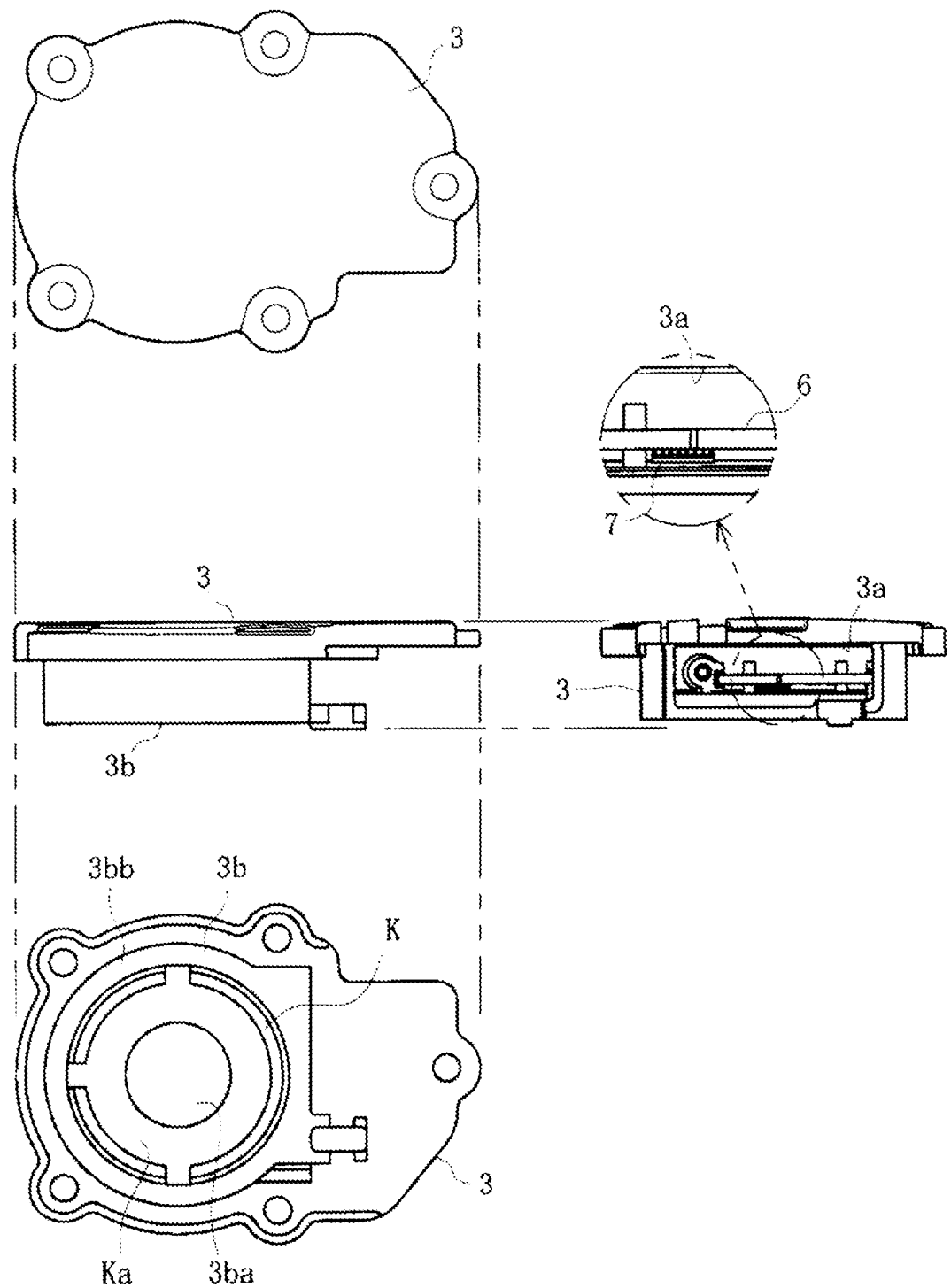
FIG. 5 is a four-view orthographic projection illustrating a cover member of the throttle operating device.

As illustrated in FIGS. 1 to 3, the cover member 3 is fixed by a mounting screw Na while covering an opening at the upper side of the fixing member 1. As illustrated in FIG. 5, the cover member 3 is composed of a molded part having the accommodation recess portion 3a which opens laterally and a lower surface 3b which faces the magnet M while being attached to the fixing member 1. A substrate 10 to which the detection sensor 11 is attached is accommodated in the accommodation recess portion 3b and the detection sensor 11 and the substrate 10 are waterproofed by being filled with a predetermined resin.

Further, in the cover member 3 according to the present embodiment, the sliding member K is fixed to the lower surface 3b of the cover member 3 by insert-molding. The sliding member K is made of an annular metal member and is configured so that the resistance force applying unit 7, which will be described below, can slide. An inner region of the sliding member K on the lower surface 3b of the cover member 3 forms an abutment surface 3ba with which the magnet M is in contact and on which the magnet M can rotate, so that the magnet M can be rotated stably.

Further, the cover member 3 can perform sealing by pressing the sealing member 9 while being attached to the fixing member 1. That is, when the cover member 3 is attached to the fixing member 1, as illustrated in FIG. 3, a pressing surface 3bb formed in a peripheral edge region of the lower surface 3b of the cover member 3 presses the sealing member 9, and thus the inside (an internal space where the rotating member 5 and the like are located) of the fixing member 1 can be sealed.

The detection sensor 11 can detect the rotational operation angle of the throttle lever 2. In the present embodiment, the detection sensor 11 is composed of an angle sensor which detects the magnetic change of the magnet M and detects the rotation angle thereof. That is, when the magnet M rotates with the rotational operation of the throttle lever 2, the detection sensor 11 detects the magnetic change of the magnet M due to the rotation and the rotational operation angle of the throttle lever 2 can be detected.

When the detection sensor 11 detects the rotational operation angle of the throttle lever 2, the detection signal is transmitted to an engine control unit (ECU) provided in the vehicle via a wiring h connected to the substrate 10 and an engine (drive source) of the vehicle is controlled based on the rotational operation angle of the throttle lever 2.

Further, the throttle operating device according to the present embodiment is provided with the resistance force applying unit 7 which can generate friction during the rotational operation of the throttle lever 2 to apply a resistance force. As illustrated in FIGS. 6 to 8, such resistance force applying unit 7 is attached to the mounting portion 5a of the rotating member 5 and is composed of a resin member urged upward by the coil spring 8. When the rotating member 5 rotates with the rotational operation of the throttle lever 2, the resistance force applying unit 7 can pivot together with the rotating member 5.

Figure 12:
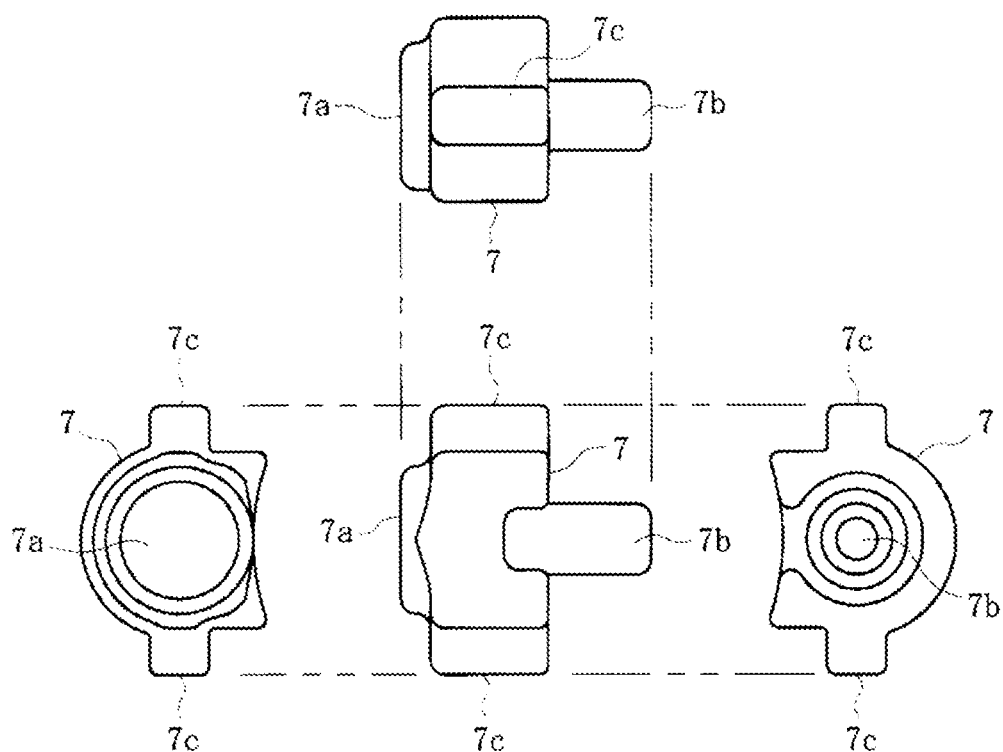
FIG. 12 is a four-view orthographic projection illustrating a resistance force applying unit of the throttle operating device.

Specifically, in the resistance force applying unit 7, as illustrated in FIG. 12, a protruding end surface 7a, a boss portion 7b, and protruding portions 7c are integrally formed. The protruding end surface 7a is composed of a plane formed at the protruding end of the resistance force applying unit 7 and is composed of a surface capable of sliding on a sliding surface Ka of the sliding member K formed on the cover member 3. The boss portion 7b has a protruding shape formed on a lower surface of the resistance force applying unit 7 and is capable of holding the coil spring 8. Further, the protruding portions 7c are composed of a pair of bulging portions formed on side surfaces of the resistance force applying unit 7. By matching the protruding portion 7c with a holding groove 5aa (see FIGS. 8 and 9) formed in the mounting portion 5a of the rotating member 5, the resistance force applying unit 7 can be positioned and the displacement of the resistance force applying unit 7 can be guided.

Figure 13:
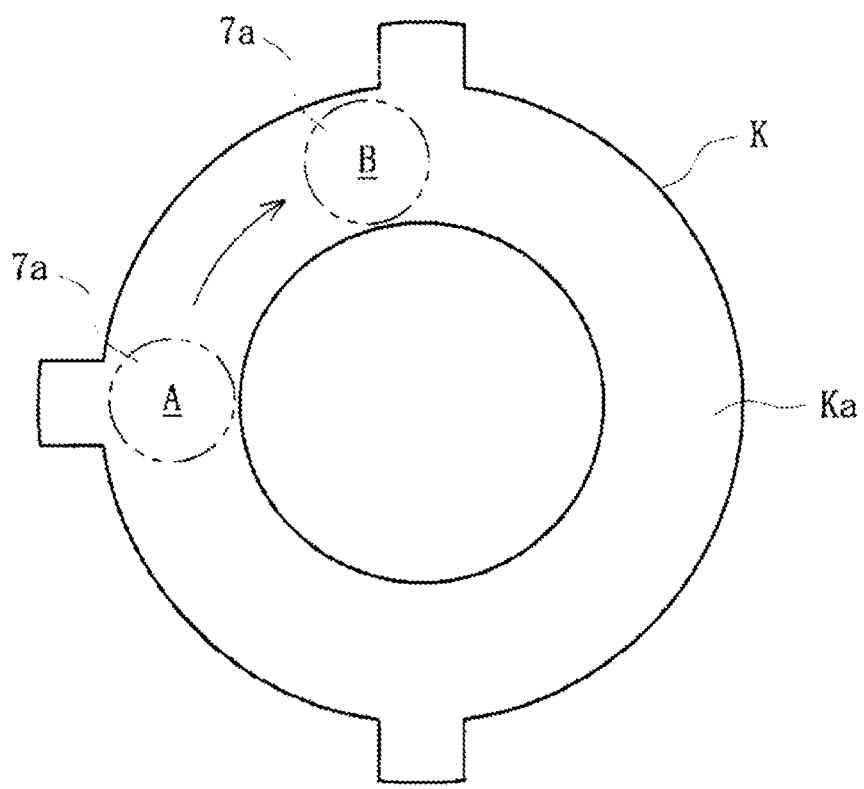
FIG. 13 is a schematic view illustrating sliding of the resistance force applying unit of the throttle operating device with respect to a sliding member.

However, the resistance force applying unit 7 is urged by the coil spring 8 toward the sliding surface Ka of the sliding member K, and as illustrated in FIG. 3, the protruding end surface 7*a* is in contact with the sliding surface Ka. When the rotating member 5 rotates with the rotational operation of the throttle lever 2 and the resistance force applying unit pivots together with the rotating member 5, as illustrated in FIG. 13, the protruding end surface 7*a* in contact with a position A can slide to a position B. That is, the sliding surface Ka formed on the cover member 3 is composed of a surface of the sliding member K formed along a movement locus of the resistance force applying unit 7. Therefore, in a process of sliding the protruding end surface 7*a* from the position A to the position B, friction can be generated to apply resistance.

According to the present embodiment, the cover member 3 covering the opening of the fixing member 1 is provided and the cover member 3 is formed with an accommodation portion (accommodation recess portion 3*a*) capable of accommodating the detection sensor 11 at a predetermined position. Therefore, the detection sensor 11 can be easily waterproofed and the detection sensor 11 can be fixed at an appropriate position where the rotational operation angle of the throttle lever 2 can be detected accurately, and further the number of parts can be reduced.

According to the present embodiment, the shaft member L which is connected to the throttle lever 2 and rotates around an axis in response to the rotational operation of the throttle lever 2 and the magnet M which can rotate together with the shaft member L in response to the rotational operation of the throttle lever 2 are provided and the detection sensor 11 is attached to the cover member 3 at a position corresponding to the magnet M in the accommodation recess portion 3*a*, and further the rotational operation angle of the throttle lever 2 can be detected based on the magnetic change of the magnet M which rotates according to the throttle lever 2. Therefore, the accommodation recess portion 3*a* for accommodating the detection sensor 11 can be formed at a position where the magnetic change of the magnet M can be detected well, and thus the rotational operation angle of the throttle lever 2 can be accurately detected.

According to the present embodiment, the resistance force applying unit 7 which can generate friction by sliding on the sliding surface Ka during the rotational operation of the throttle lever 2 to apply a resistance force is provided and the sliding surface Ka is formed on the cover member 3. Therefore, in addition to a function of covering the opening of the fixing member 1 and a function of attaching the detection sensor 11, the cover member 3 can have a function of forming the sliding surface Ka for the resistance force applying unit 7.

By providing the resistance force applying unit 7 which can generate friction and apply a resistance force during the rotational operation of the throttle lever 2, the operability at the time of the rotational operation of the throttle lever 2 can be improved and the operation feeling can be made similar, compared with the one of the related art in which an operation of a throttle lever is transmitted to an engine side via an operation wire.

In addition, since the sliding surface Ka formed on the cover member 3 is composed of the surface of the sliding member K formed along the movement locus of the resistance force applying unit 7, the resistance force applying unit 7 can be reliably slid along the sliding surface Ka.

Further, since the resistance force applying unit 7 according to the present embodiment is composed of a resin member urged toward the sliding surface Ka by the coil spring 8 (urging unit) attached to the rotating member 5 and the sliding member K is composed of a metal member insert-molded into the cover member 3, the frictional force due to the resistance force applying unit 7 can be stably generated.

According to the present embodiment, the sealing member 9 for sealing the inside of the fixing member 1 is provided and the cover member 3 can perform sealing by pressing the sealing member 9 while being attached to the fixing member 1. Therefore, in addition to the function of covering the opening of the fixing member 1 and the function of attaching the detection sensor 11, the cover member 3 can have a function of maintaining sealing by the sealing member 9.

Furthermore, the accommodation portion according to the present embodiment is composed of the accommodation recess portion 3*a* which opens toward the side of the cover member 3 and the accommodation recess portion 3*a* is filled with a predetermined resin. Therefore, waterproofing measures for the detection sensor 11 and the substrate 10 can be taken more easily and reliably. The accommodation portion for accommodating the detection sensor 11 may be an accommodation recess portion opened at an upper side of the cover member 3 and the accommodation recess portion may be filled with a predetermined resin for waterproofing.

Although the present embodiment is described above, the invention is not limited to this. For example, the accommodation portion for accommodating the detection sensor 11 may be an accommodation recess portion or the like opened at another position of the cover member 3. Further, the resistance force applying unit 7 may not be provided, or may be attached to a component (mounting member 6 or the like) different from the rotating member 5. In addition, the separate sliding member K may not be provided, and for example, the lower surface 3*b* of the cover member 3 may be processed to be a sliding surface of the resistance force applying unit 7.

If the gist is the same as that of the invention, it can be applied to those having a different appearance shape or those to which other functions are added.

According to an aspect of the invention, there is provided a throttle operating device including: a fixing member which is fixed to a vicinity of a grip formed at a tip of a handlebar of a vehicle; a throttle lever which is attached by extending from the fixing member and configured to be pivoted while the grip is gripped; and a detection sensor configured to detect a rotational operation angle of the throttle lever, where: a drive source of a vehicle is controlled based on the rotational operation angle of the throttle lever detected by the detection sensor; and a cover member is provided to cover an opening of the fixing member, and the cover member is formed with an accommodation portion capable of accommodating the detection sensor at a predetermined position.

According to the above aspect of the invention, the cover member covering the opening of the fixing member is provided and the cover member is formed with an accommodation portion capable of accommodating the detection sensor at a predetermined position. Therefore, the detection sensor can be easily waterproofed and the detection sensor can be fixed at an appropriate position where the rotational operation angle of the throttle lever can be detected accurately, and further the number of parts can be reduced.

The throttle operating device may further include: a shaft member which is connected to the throttle lever and rotates around an axis in response to a rotational operation of the throttle lever; and a magnet which can rotate together with the shaft member in response to the rotational operation of the throttle lever, where the detection sensor is attached to the cover member at a position corresponding to the magnet in the accommodation portion and is configured to detect the rotational operation angle of the throttle lever based on a magnetic change of the magnet which rotates according to the throttle lever.

According to the above, the shaft member which is connected to the throttle lever and rotates around an axis in response to a rotational operation of the throttle lever and the magnet which can rotate together with the shaft member in response to the rotational operation of the throttle lever are provided and the detection sensor is attached to the cover member at a position corresponding to the magnet in the accommodation portion, and further a rotational operation angle of the throttle lever can be detected based on the magnetic change of the magnet which rotates according to the throttle lever. Therefore, the accommodation portion for accommodating the detection sensor can be formed at a position where the magnetic change of the magnet can be detected well, and thus the rotational operation angle of the throttle lever can be accurately detected.

The throttle operating device may further include: a sliding surface which is formed on the cover member; and a resistance force applying unit configured to generate friction by sliding on the sliding surface during the rotational operation of the throttle lever to apply a resistance force.

According to the above, the sliding surface is formed on the cover member and the resistance force applying unit which can generate friction by sliding on the sliding surface during the rotational operation of the throttle lever to apply a resistance force is provided. Therefore, in addition to a function of covering the opening of the fixing member and a function of attaching the detection sensor, the cover member can have a function of forming the sliding surface for the resistance force applying unit.

In the throttle operating device, the sliding surface formed on the cover member may be composed of a surface of a sliding member formed along a movement locus of the resistance force applying unit.

According to the above, since the sliding surface formed on the cover member is composed of a surface of the sliding member formed along a movement locus of the resistance force applying unit, the resistance force applying unit can be reliably slid along the sliding surface.

In the throttle operating device, the resistance force applying unit may be composed of a resin member urged toward the sliding surface by an urging unit attached to the rotating member, and the sliding member may be composed of a metal member insert-molded into the cover member.

According to the above, since the resistance force applying unit is composed of a resin member urged toward the sliding surface by the urging unit attached to the rotating member and the sliding member is composed of a metal member insert-molded into the cover member, a frictional force due to the resistance force applying unit can be stably generated.

The throttle operating device may further include a sealing member for sealing an inside of the fixing member, where the cover member is configured to perform sealing by pressing the sealing member while being attached to the fixing member.

According to the above, the sealing member for sealing the inside of the fixing member is provided and the cover member can perform sealing by pressing the sealing member while being attached to the fixing member. Therefore, in addition to the function of covering the opening of the fixing member and the function of attaching the detection sensor, the cover member can have a function of maintaining sealing by the sealing member.

In the throttle operating device, the accommodation portion may be composed of an accommodation recess portion which opens toward a side of the cover member, and the accommodation recess portion may be filled with a predetermined resin.

According to the above, the accommodation portion is composed of the accommodation recess portion which opens toward the side of the cover member and the accommodation recess portion is filled with a predetermined resin. Therefore, waterproofing measures for the detection sensor can be taken more easily and reliably.

The invention claimed is:

1. A throttle operating device on a handlebar of a vehicle and for operating a drive source of said vehicle, said throttle operating device comprising:
    a fixing member;
    a throttle lever which is attached by extending from the fixing member and configured to be pivoted; and
    a detection sensor configured to detect a rotational operation angle of the throttle lever, wherein:
    a cover member is provided to cover an opening of the fixing member, and the cover member is formed with an accommodation portion that accommodates the detection sensor therein at a predetermined position, wherein the accommodation portion comprises an accommodation recess portion which opens toward a side of the cover member.

2. The throttle operating device according to claim 1, further comprising:
    a shaft member which is connected to the throttle lever and rotates around an axis in response to a rotational operation of the throttle lever; and
    a magnet which can rotate together with the shaft member in response to the rotational operation of the throttle lever, wherein
    the detection sensor is attached to the cover member at a position corresponding to the magnet in the accommodation portion and is configured to detect the rotational operation angle of the throttle lever based on a magnetic change of the magnet which rotates according to the throttle lever.

3. The throttle operating device according to claim 1, further comprising
    a sealing member for sealing an inside of the fixing member, wherein
    the cover member is configured to perform sealing by pressing the sealing member while being attached to the fixing member.

4. The throttle operating device according to claim 1, wherein
    the accommodation recess portion is filled with a predetermined resin.

5. A throttle operating device on a handlebar of a vehicle and for operating a drive source of said vehicle, said throttle operating device comprising:
    a fixing member;
    a throttle lever which is attached by extending from the fixing member and configured to be pivoted;
    a detection sensor configured to detect a rotational operation angle of the throttle lever;
    a cover member provided to cover an opening of the fixing member, the cover member being formed with an accommodation portion that accommodates the detection sensor therein at a predetermined position;

a sliding surface which is formed on the cover member; and a resistance force applying unit configured to generate friction by sliding on the sliding surface during the rotational operation of the throttle lever to apply a resistance force.

6. The throttle operating device according to claim 5, wherein the sliding surface formed on the cover member is composed of a surface of a sliding member formed along a movement locus of the resistance force applying unit.

7. The throttle operating device according to claim 6, wherein the resistance force applying unit is composed of a resin member urged toward the sliding surface by an urging unit attached to the rotating member, and the sliding member is composed of a metal member insert-molded into the cover member.

\* \* \* \* \*